(12) United States Patent
Lerner et al.

(10) Patent No.: US 7,545,446 B2
(45) Date of Patent: Jun. 9, 2009

(54) OFFNER RELAY FOR PROJECTION SYSTEM

(75) Inventors: Scott Lerner, Corvallis, OR (US);
Anurag Gupta, Corvallis, OR (US);
Wiatt E. Kettle, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

(21) Appl. No.: 11/213,495

(22) Filed: Aug. 27, 2005

(65) Prior Publication Data

US 2007/0047105 A1 Mar. 1, 2007

(51) Int. Cl.
*G02F 1/00* (2006.01)
*G02B 5/08* (2006.01)

(52) U.S. Cl. .............. 348/770; 348/771; 359/850; 359/857; 359/858; 359/859; 359/861; 359/863; 359/865; 359/224; 359/298; 359/738; 359/726

(58) Field of Classification Search ............ 359/196, 359/223–226, 298, 318, 708–712, 717, 726–731, 359/738–739, 850, 857–859, 861–863, 865
See application file for complete search history.

(56) References Cited

U.S. PATENT DOCUMENTS

| 3,748,015 A | 7/1973 | Offner |
| 5,155,553 A | 10/1992 | Chen |
| 5,519,518 A | 5/1996 | Watanabe et al. |
| 5,561,554 A * | 10/1996 | White et al. ............ 359/368 |
| 5,597,223 A | 1/1997 | Watanabe et al. |
| 2003/0020809 A1 | 1/2003 | Gibbon et al. |
| 2004/0027363 A1 | 2/2004 | Allen |
| 2004/0061916 A1* | 4/2004 | Kuba ................... 359/212 |
| 2004/0207815 A1 | 10/2004 | Allen et al. |
| 2005/0134805 A1 | 6/2005 | Conner et al. |
| 2006/0038997 A1* | 2/2006 | Julian et al. ............ 356/328 |

FOREIGN PATENT DOCUMENTS

EP 1367425 12/2003

OTHER PUBLICATIONS

English Translation of JP 2004-004256 (Inventor: Nakamura Akira), published Aug. 1, 2004.*
International Search Report for Application PCT/US2006/028932. Report issued Oct. 19, 2006.
Offner relay, http://www.mso.anu.edu.au/nifs/archive/desc/, last updated Jan. 21, 1999.

* cited by examiner

*Primary Examiner*—Evelyn A. Lester

(57) ABSTRACT

A projection system includes a modulator and an Offner relay. The modulator is to modulate light in accordance with sub-frames of a frame of image data. The Offner relay is to differently aim, in accordance with each sub-frame, the light as modulated.

30 Claims, 3 Drawing Sheets

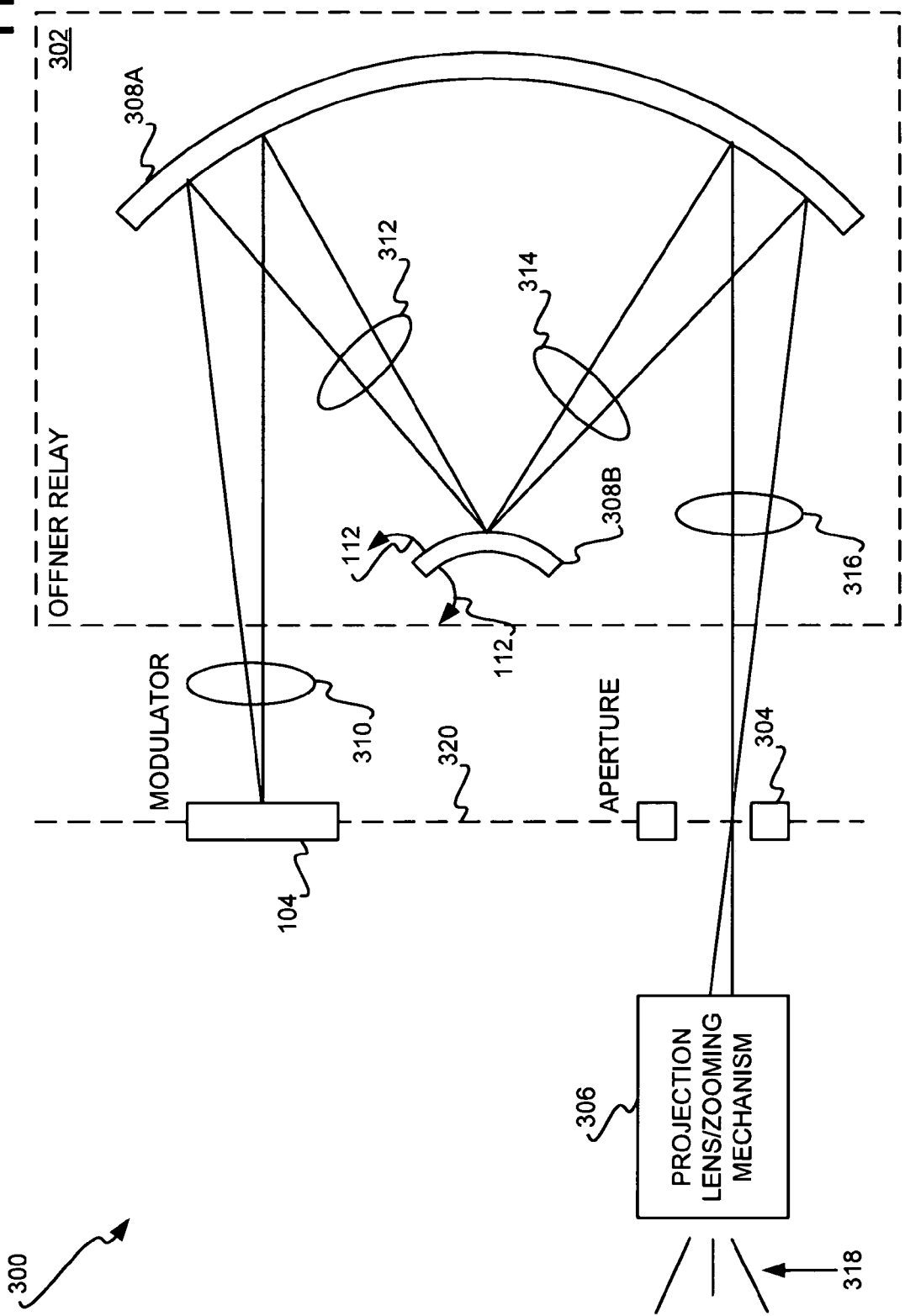

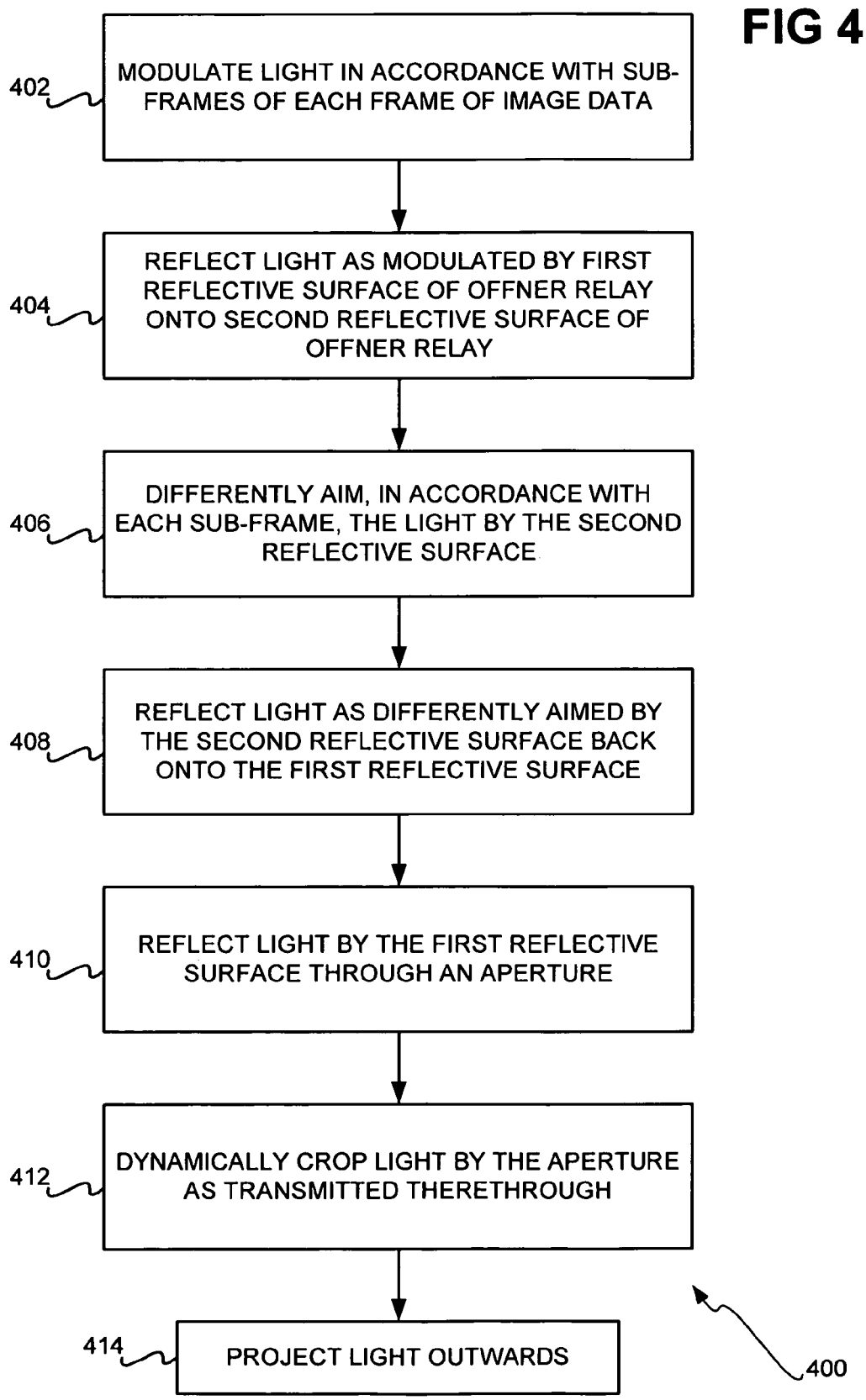

us 7,545,446 B2

OFFNER RELAY FOR PROJECTION SYSTEM

BACKGROUND

Some types of display devices, such as projectors, employ light modulators like digital micromirror devices (DMD's) to modulate light in accordance with image data. A light modulator like a DMD has a given resolution of pixel areas, and generally the resolution of the display device itself matches the resolution of the DMD or other light modulator that the display device uses. However, more recently a technique has been introduced in which the resolution of the display device is increased beyond the resolution of its DMD or other light modulator.

For instance, a mirror or lens may be moved back and forth to direct the light modulated by the DMD or other light modulator in different directions, so that a given pixel area of the DMD or other light modulator can be used for more than one pixel of the display device. The patent application entitled "Image Display System and Method," filed on Sep. 11, 2002, and published as U.S. patent application publication No. 2004/0027363, describes such an approach to increasing the resolution of a display device over that of its DMD or other light modulator. However, incorporating such a mirror or lens that performs back-and-forth movement into a projection system can be complicated, resulting in an expensive projector or projection system.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a diagram of a projection system including an Offner relay to differently aim, in accordance with each sub-frame, light that is modulated in accordance with sub-frames of a frame of image data, according to an embodiment of the invention.

FIG. 4 is a flowchart of a method, according to an embodiment of the invention.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, electro-optical, software/firmware and other changes may be made without departing from the spirit or scope of the present invention. The following detailed description is, therefore, not to be taken in a limiting sense, and the scope of the present invention is defined only by the appended claims.

Figure 1:
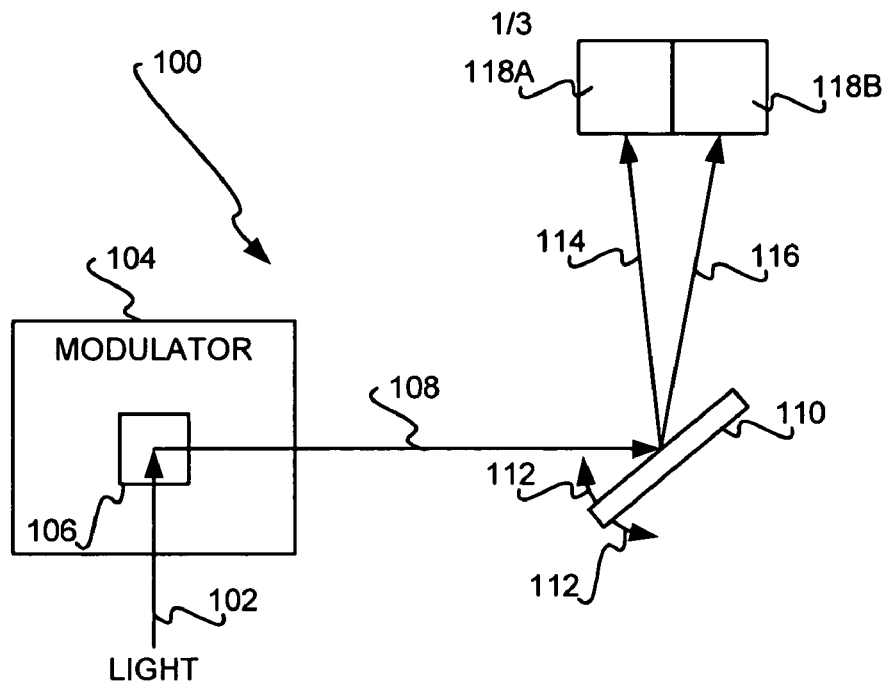
FIG. 1 is a diagram of the general approach by which a modulator having a given resolution can be employed to yield the display of image data with a greater resolution by using a physically adjustable aiming mechanism, according to an embodiment of the invention.

FIG. 1 shows a general approach 100 by which a light modulator 104 having a given resolution can be employed to yield the display of image data with a greater resolution, according to an embodiment of the invention. The approach 100 is exemplarily described in relation to a single pixel area 106 of the modulator 104. However, the approach 100 is the same for all the pixels of the modulator 104. Furthermore, the approach 100 may be that which is more particularly described in the patent application entitled "Image Display System and Method," filed on Sep. 11, 2002, and published as U.S. patent application publication No. 2004/0027363.

Light is directed towards the modulator 104, as indicated by the arrow 102. The modulator 104 may be a digital micromirror device (DMD), or another type of light modulator. The pixel area 106 of the modulator 104 specifically modulates the light in accordance with either a first pixel or a second pixel of image data. The pixel area 106 may correspond to an individual micromirror within a DMD, for instance. The light as modulated by the pixel area 106 is directed towards an aiming mechanism, or device, 110, as indicated by the arrow 108. The aiming mechanism 110 may be or include a mirror, a lens, a refractive plate of refractory glass, or another type of aiming mechanism. The aiming mechanism 110 is able to move back and forth, as indicated by the arrows 112. That is, the aiming mechanism 110 is able to be physically adjusted. As depicted in FIG. 1, the aiming mechanism 110 is reflective, but can also be refractive. That is, the aiming mechanism 110 may be a reflective aiming device, or a refractive aiming device. The aiming mechanism 110 may alternatively be referred to as an image shifter, or an image-shifting device.

When the pixel area 106 has modulated the light in accordance with the first pixel of the image data, the aiming mechanism 110 directs the light to the position 118A, as indicated by the arrow 114. When the pixel area 106 has modulated the light in accordance with the second pixel of the image data, the aiming mechanism 110 directs the light to the position 118B, as indicated by the arrow 116. The positions 118A and 118B, collectively referred to as the positions 118, are depicted in FIG. 1 as being adjacent positions, but in other embodiments may be non-adjacent, or may be overlapping. Therefore, it is said that the aiming mechanism 110 differently aims the light. That is, for the first pixel, the aiming mechanism 110 aims the light to the position 118A, whereas for the second pixel, the aiming mechanism 110 aims the light to the position 118B. In this way, the aiming mechanism 110 is capable of differently aiming the light to different positions.

Physically adjusting the aiming mechanism 110 depending on the pixel of the image data in accordance with which the pixel area 106 of the modulator 104 is currently modulating the light allows the pixel area 106 to be used for more than one pixel of the image data. With respect to all the pixel areas of the modulator 104, this approach 100 allows for the display of image data with greater resolution than the number of pixel areas of the modulator 104 itself. The approach 100 has been described in relation to the pixel area 106 being able to be used for two pixels. However, in other embodiments, the approach 100 may be used so that each pixel area of the modulator 104 can be used for more than two pixels. Physically adjusting the aiming mechanism 110 to move the aiming mechanism 110 so that it directs light to different positions can be accomplished by using an actuator, which may be part of the aiming mechanism 110, that is responsive to a signal.

Furthermore, the pixel area 106 may modulate the light in accordance with elements of the image data other than individual pixels. For instance, the pixel area 106 may modulate the light in accordance with a first sub-pixel of a given pixel, and then modulate the light in accordance with a second sub-pixel of the same pixel. In such an embodiment, the aiming mechanism 110 may direct the light as modulated by the pixel area 106 in accordance with the first sub-pixel to the position 118A, and direct the light as modulated by the pixel area 106 in accordance with the second sub-pixel to the position 118B.

Figure 2:
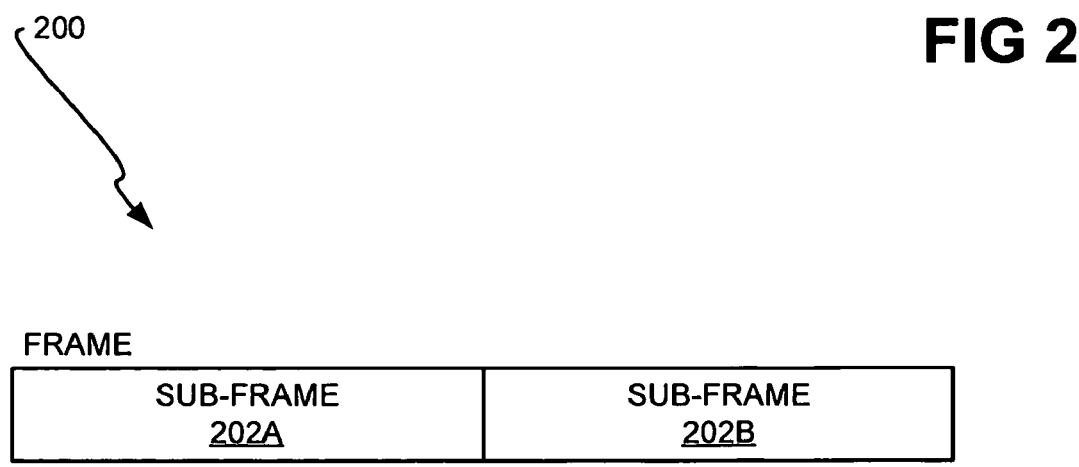
FIG. 2 is a diagram of a frame of image data divided into two sub-frames, according to an embodiment of the invention.

FIG. 2 shows a representative frame 200 of image data that can be used in conjunction with the approach 100 of FIG. 1, according to an embodiment of the invention. The frame 200 is divided into a first sub-frame 202A and a second sub-frame 202B, collectively referred to as the sub-frames 202. The sub-frame 202A may in one embodiment contain half of the pixels of the image data, and the sub-frame 202B may contain the other half of the pixels of the image data. In another embodiment, the sub-frame 202A may contain half of the sub-pixels of all the pixels of the image data, and the sub-frame 202B may contain the other half of the sub-pixels of all the pixels of the image data.

With respect to the positions 118 and the pixel area 106 in FIG. 1, the sub-frame 202A contains the part of the image data that the pixel area 106 modulates light in accordance therewith while the aiming mechanism 110 is directing this light onto the position 118A, as indicated by the arrow 114. Similarly, the sub-frame 202B contains the part of the image data that the pixel area 106 modulates light in accordance therewith while the aiming mechanism is directing this light onto the position 118B, as indicated by the arrow 116. Thus, by dividing each accordance with the different sub-frames as the aiming mechanism 110 directs this modulated light to different positions.

FIG. 3 shows a projection system 300, according to an embodiment of the invention. The projection system 300 may be implemented as a projector, and is depicted in FIG. 3 as including the modulator 104, an Offner relay 302, an aperture 304, and a projection lens/zooming mechanism 306. As can be appreciated by those of ordinary skill within the art, the projection system 300 may include other components, in addition to and/or in lieu of those depicted in FIG. 3.

The modulator 104 modulates light in accordance with the sub-frames of a frame of image data, as has been described, to result in modulated light 310. The modulated light 310 enters the Offner relay 302. The Offner relay 302 is a particular type of an optical relay mechanism, and includes a first reflective surface 308A and a second reflective surface 308B, collectively referred to as the reflective surfaces 308, configured as depicted in FIG. 3 and as will be described. The first reflective surface 308A may be a spherical or an aspherical reflective surface, and similarly the second reflective surface 308B may be a spherical or an aspherical reflective surface.

The Offner relay system as described by the mirrors 308A and 308B images the active area of the modulator at the plane of the aperture 304. Thus, a virtual modulator is created at the plane of the aperture 304. The modulated light 310 is reflected by the first reflective surface 308A onto the second reflective surface 308B, as the light 312. The light 312 is then reflected by the second reflective surface 308B back onto the first reflective surface 308A, as the light 314. The light 314 is reflected by the first reflective surface 308A to the aperture 304. The light 314 is then transmitted through the aperture 304 to the projection lens/zooming mechanism 306. The projection lens/zooming mechanism 306 images the virtual modulator at the plane of the aperture 304 onto a screen or other surface. The projection lens/zooming mechanism 306 outwardly projects the light 314 from the projection system 300, as the light 318. The projection system 300 is thus a front projection system in one embodiment.

The aiming mechanism 110 of FIG. 1 that has been described is implemented within the projection system 300 as the second reflective surface 308B. In particular, the second reflective surface 308B is capable of being physically adjusted, as indicated by the arrows 112, to differently aim the light 312 in accordance with each sub-frame of a frame of image data. Differently aiming the light 312 in accordance with each sub-frame of a frame of image data means that when the light 312 is modulated in accordance with one sub-frame, the light 312 is directed to a first position, when the light 312 is modulated in accordance with another sub-frame, the light 312 is directed to a second position, and so on. It is noted that conventional Offner relays do not have their second reflective surface 308B physically adjusted in this manner. Rather, embodiments of the invention provide for such physical adjustment of the second reflective surface 308B within the Offner relay 302 to differently aim the light 312 in accordance with each sub-frame of a frame of image data. Thus, the Offner relay 302 differently aims light through the aperture 304.

In one embodiment, the projection lens/zooming mechanism 306 does not provide zoom-related functionality, and thus does not perform zoom-related actions, such that it is a fixed projection lens mechanism. In such an embodiment, the projection lens/zooming mechanism 306 functions to outwardly project the light 316 differently aimed through the aperture 304. The Offner relay 302 thus differently aims light in accordance with each sub-frame prior to projection of the light 316 outward from the projection system 300.

In another embodiment, the projection lens/zooming mechanism 306 does provide zoom-related functionality, and thus performs zoom-related actions, such that it is a zooming projection lens mechanism. With a fixed projection lens mechanism, the only way to control the size of the image projected by the projection system 300 is to move the projection system 300 closer to or farther away from the screen or other surface on which the image is being projected. Therefore, where the projection lens/zooming mechanism 306 provides zoom-related functionality, the size of the image projected by the projection system 300 is adjustable without having to physical move the projection system 300 closer to or farther away from the screen or other surface on which the image is being projected. It is noted that the Offner relay 302 differently aims light in accordance with each sub-frame prior to zooming and projection of the light 316 outward from the projection system 300.

By providing the Offner relay 302 with the capability to differently aim light in accordance with each sub-frame, the relay 302 becomes a modularized component that is largely independent of the projection lens/zooming mechanism 306 and the projection system 300 as a whole. That is, if differently aiming the light in accordance with each sub-frame is instead accomplished within or after the projection lens/zooming mechanism 306, the mechanism 306 would have to be designed to take into account such differently aiming of the light. By comparison, where the light is differently aimed prior to passage through the projection lens/zooming mechanism 306, the mechanism 306 does not have to be designed to take into account such differently aiming of the light. This allows the differently aiming of the light to be implemented within the projection system 300 in a more cost-effective and less complex manner, because it is not dependent on the particular projection lens/zooming mechanism 306 being used, as well as on other components of the projection system 300.

The aperture 304 may also be referred to as a field stop. The aperture 304 and the modulator 104 are in one embodiment located at least substantially on the same plane 320. That is, the aperture 304 and the modulator 104 are in one embodiment at least substantially coplanar in position. The light 316 that is transmitted at the plane 320 is considered an intermediate image of the modulator 104, prior to optional zooming and ultimately projection outwards from the projection system 300 by the projection lens/zooming mechanism 306, as the light 318. The projection lens/zooming mechanism 306, in other words, images the intermediate image at the aperture 304 and the plane 320 outwards from the projection system 300.

Using an Offner relay 302 within the optical path between the modulator 104 and the aperture 304 allows for better positioning of the aperture 304, on substantially the same plane 320 as the modulator 104. The aperture 304 provides for optimal illumination control, because it can mask scattered and other undesirable light that may be reflected from the modulator 104 through the Offner relay 302. Thus, inclusion of the Offner relay 302 within the projection system 300 provides for image quality benefits, since just the desired image is transmitted through the aperture 304, and other undesired illumination can be masked or blocked by the aperture 304.

The aperture 304 may further be a variable or dynamic aperture, or a dynamic or variable field stop, to dynamically control and thus crop the light 316 that is transmitted through the aperture 304. Such dynamic control of the light 316 allows the aperture 304 to differently control the aspect ratio of the image projected by the projection system 300 as desired. For instance, the aperture 304 may be adjusted to an opening shape corresponding to a 2.35:1 aspect ratio, a 1.78:1 aspect ratio, a 4:3 aspect ratio, a 16:9 aspect ratio, or another aspect ratio. Such a variable or dynamic aperture 304 may be controlled in accordance with one or more parameters. For instance, the parameters may include the amount of dark content that is detected on one or more sides of the frames of the image data that is be masked by the aperture 304. Such dark content may correspond to black or gray vertical or horizontal bars as may be present in letterboxed video content, for example. The parameters may also include a preset ratio that is to be maintained, as opposed to dynamic detection of dark content on the sides of the frames of the image data.

FIG. 4 shows a method 400, according to an embodiment of the invention. The method 400 is described in relation to the projection system 300 that has been described. Light is modulated in accordance with the sub-frames of each frame of image data, by the modulator 104, resulting in the modulated light 310 (402). The light 310 as modulated is then reflected by the first reflective surface 308A of the Offner relay 302 onto the second reflective surface 308B of the Offner relay 302, resulting in the light 312 (404).

The light 312 is differently aimed, in accordance with each sub-frame, by the second reflective surface 308B of the Offner relay 302, via physical adjustment of the second reflective surface 308B (406). The second reflective surface 308B reflects the light as differently aimed back to the first reflective surface 308A of the Offner relay 302, as the light 314 (408). The first reflective surface 308A then reflects the light through the aperture 304, as the light 316 (410).

The aperture 304 dynamically crops the light 316 as transmitted therethrough, in one embodiment of the invention (412), and the light 316 is projected outwards from the projection system 300 via the projection lens/zooming mechanism 306, as the light 318 (414). Projection of the light 316 can include zooming of the light 316 to result in a different image size in one embodiment of the invention. Dynamic cropping of the light 316 includes physically adjusting the aperture 304 to change its size. The cropping of the light 316 may be dynamic in one embodiment in the sense that a user is able to specify the aspect ratio of the image projected within the light 316.

In another embodiment, dynamically cropping the light transmitted through the aperture 304 includes monitoring at least two sides of the frames of the image data for dark content, such that the frames can be masked by the aperture 304 to crop the light corresponding to the dark content thereof. The dark content may be gray or black horizontal or vertical bars that can be present in letterboxed video content, for example.

For instance, the left or the right side, and the top or the bottom side, of the frames may be monitored. Thus, for example, if the left side of the frames contains dark content, then it may be presumed that the right side thereof correspondingly contains dark content, such that the aperture 304 is appropriately varied to mask this dark content on both the left and the right sides. Similarly, if the top side of the frames contains dark content, then it may be presumed that the bottom side of the frames contains dark content, such that the aperture 304 is appropriately varied to mask this dark content on both the top and bottom sides. Alternatively, all four sides of the frames of the image data may be monitored, and where dark content is detected on any given side, the aperture 304 is appropriately varied to mask such dark content.

Such monitoring of the frames may in one embodiment be performed on a frame-by-frame basis. That is, the aperture 304 may be varied for each frame of the image data to mask the dark content of such a frame being projected. Monitoring on a frame-by-frame basis may result in significant and/or constant variation of the aperture 304. Therefore, in another embodiment, the frames may be monitored on a group of frames-by-group of frames basis. The dark content of a number of successive frames may thus be averaged together, for instance, to determine the extent to which all of these frames should be masked by physically varying the aperture 304. Alternatively, the least dark content that is encountered in any of the frames of the group may be used as the basis upon which all of the frames of the group are dynamically cropped by varying the aperture 304. In such embodiments, the aperture 304 is therefore varied once for each group of frames.

Furthermore, the monitoring of the frames may be accomplished just for a predetermined length of time after a change in video synchronization of the frames of the image data occurs. A change in video synchronization of the frames may also be referred to as a deviation in the cadence of the frames, as can be appreciated by those of ordinary skill within the art. When a new synchronization occurs, monitoring is performed for a length of time thereafter to determine how much to vary the aperture 304 to mask dark content from the sides of the frames. Once the aperture 304 is varied, it can then remain at its current setting until another change in video synchronization of the frames of the image data is detected.

However, continued monitoring of the frames may nevertheless still be performed. If frames are subsequently detected in which a portion thereof contains non-dark content that will be masked by the current setting of the aperture 304, then the aperture 304 is again varied so that this non-dark content is not be masked by the aperture 304 when these frames are projected. Therefore, the aperture 304 is initially set when a change in video synchronization is detected, and from that point the aperture 304 is just varied to increase the amount of light that is transmitted through the aperture 304—and not to decrease the amount of light transmitted therethrough—until a new change in video synchronization is detected. In other words, for a given change in video synchronization, the aperture 304 is initially varied and thereafter is varied just to increase the amount of light that is transmitted therethrough, until a new change in video synchronization is detected and the aperture 304 is again initially varied.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A projection system comprising:
   a modulator to modulate light in accordance with a plurality of sub-frames of a frame of image data; and,
   an Offner relay to differently aim, in accordance with each sub frame, the light as modulated.

2. The projection system of claim 1, further comprising an aperture through which the Offner relay is to differently aim, in accordance with each sub-frame, the light as modulated.

3. The projection system of claim 2, wherein the aperture and the modulator are at least substantially coplanar to one another.

4. The projection system of claim 2, wherein the aperture is a variable aperture such that the light transmitted through the aperture is dynamically controllable.

5. The projection system of claim 4, wherein the variable aperture functions to crop the light transmitted therethrough in accordance with one or more parameters.

6. The projection system of claim 2, further comprising a projection lens mechanism to outwardly project the light differently aimed through the aperture.

7. The projection system of claim 1, wherein the Offner relay comprises:
   a first reflective surface; and,
   a second reflective surface to be physically adjusted to differently aim, in accordance with each sub-frame, the light as modulated.

8. The projection system of claim 7, wherein the light modulated by the modulator is reflected by the first reflective surface onto the second reflective surface, and then is reflected by the second reflective surface back onto the first reflective surface.

9. The projection system of claim 7, wherein the first reflective surface is an aspherical reflective surface.

10. The projection system of claim 7, wherein the second reflective surface is a conical reflective surface.

11. A projection system comprising:
    a modulator to modulate light in accordance with a plurality of sub-frames of a frame of image data; and,
    an optical relay mechanism to differently aim, in accordance with each sub-frame, the light as modulated, prior to zoom-related actions being performed on the light.

12. The projection system of claim 11, further comprising a zooming mechanism to perform zoom-related actions on the light after the optical relay mechanism has differently aimed, in accordance with each sub-frame, the light as modulated.

13. The projection system of claim 11, wherein the optical relay mechanism comprises an Offner relay.

14. The projection system of claim 11, wherein a portion of the optical relay mechanism is physically adjusted to differently aim, in accordance with each sub-frame, the light as modulated.

15. The projection system of claim 11, further comprising a variable aperture through which the optical relay mechanism is to differently aim, in accordance with each sub-frame, the light as modulated,
    wherein the variable aperture is dynamically controllable to crop the light transmitted therethrough in accordance with one or more parameters.

16. The projection system of claim 15, wherein the variable aperture and the modulator are at least substantially coplanar to one another.

17. The projection system of claim 11, further comprising a projection lens mechanism to outwardly project the light.

18. A projection system comprising:
    means for modulating light in accordance with a plurality of sub-frames of a frame of image data; and,
    means for differently aiming, in accordance with each sub-frame, the light as modulated, prior to performing zoom-related actions on the light.

19. The projection system of claim 18, further comprising means for performing zoom-related actions on the light after the light has been differently aimed, in accordance with each sub-frame.

20. An optical relay mechanism for a projection system comprising:
    a first reflective surface to receive light modulated in accordance with a plurality of sub-frames of a frame of image data; and,
    a second reflective surface to receive the light as reflected by the first reflective surface, to differently aim, in accordance with each sub-frame, the light as modulated and to reflect the light back onto the first reflective surface.

21. The optical relay mechanism of claim 20, wherein the first reflective surface is further to reflect the light, as reflected back thereon by the second reflective surface, outward from the optical relay mechanism.

22. The optical relay mechanism of claim 20, wherein the second reflective surface is to differently aim, in accordance with each sub-frame, the light as modulated by being physically adjusted in accordance with each sub-frame.

23. The optical relay mechanism of claim 20, wherein the first reflective surface is an aspherical reflective surface and the second reflective surface is a conical reflective surface.

24. A method comprising:
    modulating light in accordance with a plurality of sub-frames of each of a plurality of frames of image data;
    reflecting the light as modulated by a first reflective surface onto a second reflective surface;
    differently aiming, in accordance with each sub-frame, the light by the second reflective surface, via physical adjustment of the second reflective surface;
    reflecting the light as differently aimed by the second reflective surface back onto the first reflective surface; and,
    reflecting the light by the first reflective surface through an aperture.

25. The method of claim 24, farther comprising dynamically cropping the light by the aperture as transmitted therethrough.

26. The method of claim 25, wherein dynamically cropping the light by the aperture as transmitted therethrough comprises physically adjusting the aperture.

27. The method of claim 25, wherein dynamically cropping the light by the aperture as transmitted therethrough comprises monitoring at least two sides of the frames of the image data for dark content, such that the dark contents of the frames of the image data are cropped from the light transmitted through the aperture.

28. The method of claim 27, wherein monitoring at least two sides of the frames of the image data for dark content is accomplished on a frame-by-frame basis or a group of frames-by-group of frames basis.

29. The method of claim 27, wherein monitoring at least two sides of the frames of the image data for dark content is accomplished for a predetermined length of time after a change in video synchronization of the frames of the image data.

30. The method of claim 29, wherein dynamically cropping the light by the aperture as transmitted therethrough further comprises monitoring at least sides of the frames of the image data for dark content where a portion of the frames of the image data contains non dark content that is being masked, resulting from cropping of the light by the aperture.

* * * * *

UNITED STATES PATENT AND TRADEMARK OFFICE
CERTIFICATE OF CORRECTION

| | |
|---|---|
| PATENT NO. | : 7,545,446 B2 |
| APPLICATION NO. | : 11/213495 |
| DATED | : June 9, 2009 |
| INVENTOR(S) | : Scott Lerner et al. |

It is certified that error appears in the above-identified patent and that said Letters Patent is hereby corrected as shown below:

In column 3, line 28, after "each" insert -- frame of the image data into sub-frames, the modulator 104 modulates light in --.

In column 8, line 56, in Claim 25, delete "farther" and insert -- further --, therefor.

Signed and Sealed this

Twenty-second Day of September, 2009

David J. Kappos
*Director of the United States Patent and Trademark Office*